Jan. 14, 1958 A. F. GARBARINO 2,819,859
SKID PLATFORM CONSTRUCTION
Filed March 8, 1955 2 Sheets-Sheet 1
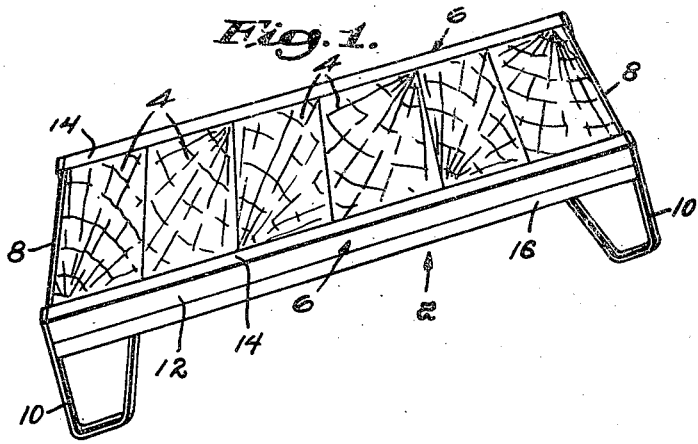
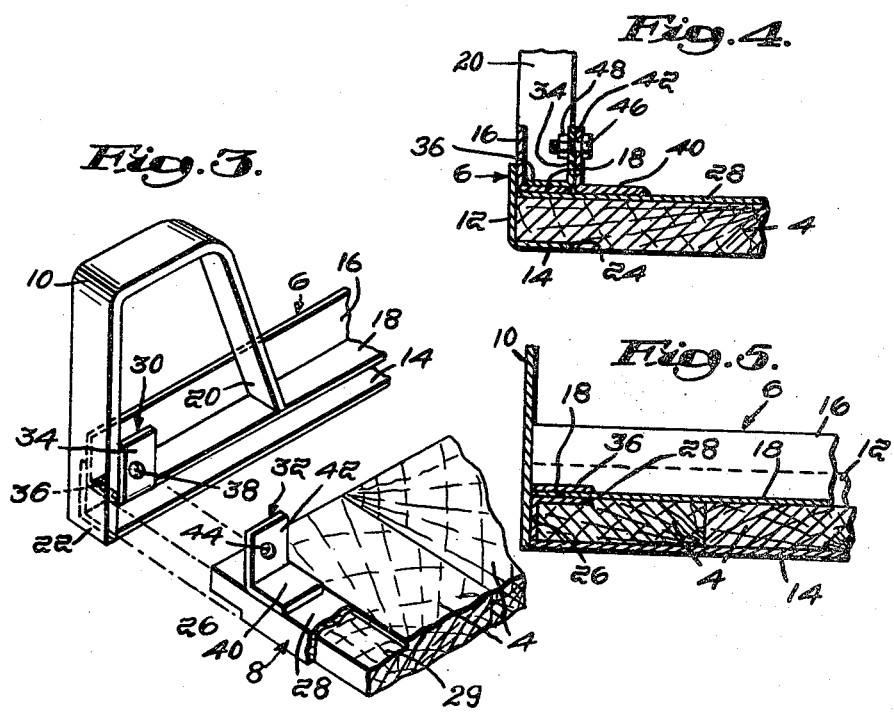
Inventor:
A. Frank Garbarino,
by Heard, Smith, Porter, Chittick
Attorneys Jan. 14, 1958 A. F. GARBARINO 2,819,859
SKID PLATFORM CONSTRUCTION
Filed March 8, 1955 2 Sheets-Sheet 2
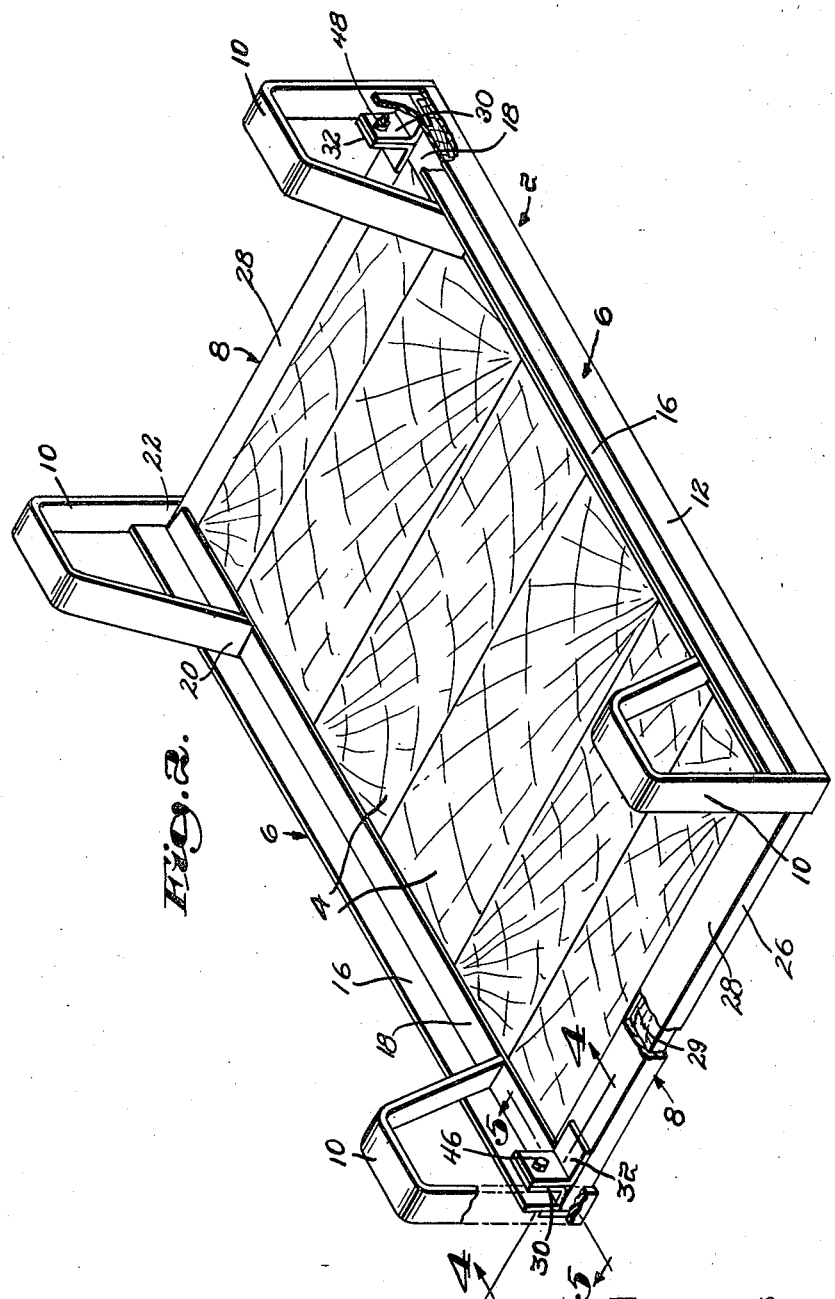
Inventor:
A. Frank Garbarino,
by Heard, Smith, Porter, Chittick
Attorneys

United States Patent Office 2,819,859
Patented Jan. 14, 1958

2,819,859

SKID PLATFORM CONSTRUCTION

Americo Frank Garbarino, West Acton, Mass., assignor to Lewis-Shepard Company, Watertown, Mass., a corporation of Massachusetts Application March 8, 1955, Serial No. 493,033

2 Claims. (Cl. 248—120)

This invention relates to skid platforms for use with hydraulic and mechanical hand lift trucks, and more particularly to skid platforms of improved and novel construction.

A skid platform generally consists of a metallic frame or chassis supporting a plurality of hardwood crossboards that serve as a supporting surface or floor for material to be conveyed by the platform. In order to provide durability and strength, it has been the general practice to weld the sections of the chassis together. This has the disadvantage of necessitating rupture of the welded joint between one or more sections of the chassis in order to replace boards which have become cracked or broken due to shock loads or which may have rotted due to spillage of corrosive materials. While the use of bolts and nuts as a substitute for welding have been contemplated, it has not found as much favor as the weld construction for the reason that a conventional bolted joint lacks the structural strength of a welded joint and exhibits a tendency to loosen after extended use. In addition, the bolts may cause splitting or splintering of the crossboards.

Accordingly I have invented certain improvements in skid platforms that enable the skid platform chassis to have substantially the same strength as a chassis of welded construction while simultaneously being adapted to be dismantled for replacement of broken or rotted crossboards.

It is therefore an object of this invention to provide an improved skid platform featuring bolted construction at its corners.

A more specific object is to provide a skid platform having a chassis comprising a plurality of frame elements which are bolted together at strategic locations in such a manner that the chassis is capable of withstanding repeated shock loads while simultaneously being adapted to be easily and rapidly dismantled for replacement of broken or rotted crossboards.

Other objects and many of the attendant advantages of this invention will be readily appreciated as the same becomes better understood by reference to the following detailed description when considered in connection with the accompanying drawings, wherein:

Fig. 1 is a perspective view of a skid platform embodying the bolted connection of the present invention;

Fig. 2 is an enlarged isometric view of the skid platform of Fig. 1 in inverted position;

Fig. 3 is an exploded fragmentary view of one corner of the inverted skid platform of Fig. 2;

Fig. 4 is an enlarged fragmentary sectional view taken along line 4—4 of Fig. 2;

Fig. 5 is an enlarged fragmentary sectional view taken along line 5—5 of Fig. 2.

Looking now to Figs. 1 and 2, there is shown a skid platform 2 conforming, except for certain improvements provided according to the present invention, to skid platforms of a type known to the prior art. Essentially the platform consists of a plurality of crossboards 4 supported in a steel chassis, the chassis comprising two side bolsters designated generally at 6 and two end pieces designated generally at 8 maintaining the side bolsters in parallel spaced relation, and four feet 10 for supporting the platform secured to the bottom of the chassis at its four corners.

As seen in inverted position in Figs. 2 through 5, each side bolster 6 comprises an upper angle iron having a vertical portion 12 and a horizontal flange 14, and a lower angle iron having a vertical portion 16 and a horizontal portion 18. The lower angle iron is positioned inside of the upper angle iron, their corresponding vertical portions being in overlapping and welded relation. Each of the feet 10 is welded at its inner end 20 to the bottom surface of horizontal flange 18 and at its opposite end 22 to the end faces of the two horizontal flanges 14 and 18.

The crossboards 4 extend between the two bolsters 6, the ends of the boards residing between horizontal flanges 14 and 18, preferably in abutting relation with the inner surface of vertical portion 12 of the upper angle iron to minimize shifting. Each of the cross boards 4 is grooved as indicated at 24 to receive the upper flange 14, whereby the top surface of the platform is substantially smooth throughout.

The end pieces 8 are also of angle iron construction, consisting of a vertical portion 26 and a horizontal flange 28. The end pieces 8 also reside between the horizontal flanges 14 and 18 of the side bolsters 6. The horizontal flange 28 of each of the end pieces underlies the edge of one of the end crossboards 4, the inner side of each of the end crossboards being grooved as at 29 to accommodate said horizontal flange.

At two diagonally opposite corners of the platform, in this case the top and bottom corners as seen in Fig. 2, the end pieces 8 are welded directly to bolsters 4 according to conventional practice. Each of the end pieces is welded to the horizontal flanges 14 and 18 at the aforesaid top and bottom corners and, as an optional measure, may be welded to the inner surface of the outer end 22 of the foot 10 at that corner of the chassis.

At the two opposite corners, in this case the left and right hand corners as seen in Fig. 2, the end pieces 8 are bolted to the side bolsters 6 according to the present invention.

This is accomplished by providing brackets in the form of knee elements designated generally as 30 at the end of each bolster and by further providing a complementary knee element generally designated as 32 at the end of each end piece 8. Knee elements 30 are essentially angle irons comprising a vertical portion 34 depending from a horizontal flange 36. The horizontal flange is welded to the under surface of horizontal flange 18 at its end. The vertical portion 34 is provided with an opening 38. A complementary knee element 32 comprises a horizontal flange 40 welded to the under side or horizontal flange 28 of end piece 8 and a vertical depending portion 42 provided with an opening 44. The complementary knee element 32 is spaced from the end of end piece 8 a distance sufficient to permit the end of the end piece to be in engagement with the vertical portion 12 of the upper angle iron member of the bolster when the vertical portion 42 of the complementary knee member is in engagement with the corresponding vertical portion 34 of knee member 30 secured to the bolster.

A bolt 46 is inserted in openings 38 and 44 and a nut 48 is threaded on bolt 46 to draw the vertical portions of the knee elements into tight engagement with each other. Dismantling of the frame is accomplished by simply unscrewing nuts 48 from bolts 46 and drawing end pieces 8 out from between the flanges 14 and 18 of the bolsters at the diagonally opposite corners of the frame.

It is believed apparent that in the illustrated construction the frame or chassis comprises two symmetrical or identical halves each consisting of a bolster and an end piece welded to the bolster, the free end of the end piece being provided with a knee which can be secured by means of a bolt and nut to a complementary knee secured to the free end of the bolster of the opposite identical half. In view of the fact that the chassis is easily dismantled, it is believed obvious that replacement of a rotted or cracked crossboard is a simple matter requiring merely a wrench for securing the two halves of the chassis together by means of the bolt and nut connection. However, it is also to be understood that the chassis may be formed in four instead of two parts, each bolster 6 being secured at its opposite ends by means of a bolt and nut connection to the ends of the two end pieces 8. However, the illustrated construction is preferred since it can be dismantled with sufficient ease.

Since the free end of each end piece 8 fits between the horizontal flanges of the side bolsters, the knee elements secured to the bolsters and the end pieces are subjected to only a minor portion of the vertical loads carried by the platform. The knees serve merely to prevent the sections of the chassis from separating and the bolts 46 receive little or no vertical or horizontal stresses since most of the load applied force is taken up by the engagement of the end of the end member with the corresponding bolster and foot.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practiced otherwise than as specifically described or illustrated.

I claim:
1. A skid platform comprising a pair of spaced parallel side members, each having upper and lower inwardly extending horizontal flanges connected by a vertical flange, a pair of end members the ends of which are rigidly attached to the ends of said side members, a flooring member having its opposite side portions positioned within said flanges, the points of attachment between said side and end members at one pair of diagonally opposite corners being separable and at the other pair of diagonal corners being inseparable, the structure at said diagonally opposite separable points of attachment comprising the end of the end member fitting within the confines of said flanges, a first bracket connected to the under side of said end member and having a vertically disposed portion, another bracket connected to the lower of said flanges and having a vertically disposed portion located in close parallel relationship with the said vertical portion of said first bracket, and a bolt for drawing said portions together, said side and end members when separated at the said diagonally opposite separable corners upon release of both of said pairs of brackets enabling the release and replacement of said flooring member.

2. A skid platform as set forth in claim 1, in which the two said vertically disposed portions of the brackets lie parallel to the longitudinal dimension of said side member.

References Cited in the file of this patent
UNITED STATES PATENTS

| | | |
|---|---|---|
| 656,449 | Ferguson | Aug. 21, 1900 |
| 1,349,500 | Dietz | Aug. 10, 1920 |
| 1,618,257 | Young | Feb. 22, 1927 |
| 1,794,113 | Hoyos | Feb. 24, 1931 |
| 2,109,784 | Shepard | Mar. 1, 1938 |